United States Patent
Ross et al.

(10) Patent No.: US 11,055,156 B2
(45) Date of Patent: Jul. 6, 2021

(54) PROCESSING OF A MESSAGE STREAM

(71) Applicant: International Business Machines Corporation, Armonk, NY (US)

(72) Inventors: Martin A. Ross, Gosport (GB); Andrew Stephen Marcus Edwards, Southampton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/545,121

(22) Filed: Aug. 20, 2019

(65) Prior Publication Data

US 2021/0055976 A1 Feb. 25, 2021

(51) Int. Cl.
*G06F 9/54* (2006.01)
*G06F 11/07* (2006.01)

(52) U.S. Cl.
CPC ............ *G06F 9/546* (2013.01); *G06F 11/076* (2013.01); *G06F 11/0757* (2013.01)

(58) Field of Classification Search
CPC ..... G06F 9/546; G06F 11/0757; G06F 11/076
See application file for complete search history.

(56) References Cited

U.S. PATENT DOCUMENTS

| | | | |
|---|---|---|---|
| 9,038,093 B1 | 5/2015 | Leonard | |
| 10,230,670 B1 | 3/2019 | Cui et al. | |
| 2002/0097734 A1* | 7/2002 | Amou | H04Q 11/0478 |
| | | | 370/412 |
| 2006/0039393 A1* | 2/2006 | Firoiu | H04L 47/50 |
| | | | 370/412 |
| 2008/0089364 A1* | 4/2008 | Barry | H04L 47/564 |
| | | | 370/517 |
| 2010/0054268 A1* | 3/2010 | Divivier | H04L 47/624 |
| | | | 370/412 |
| 2010/0309783 A1* | 12/2010 | Howe | H04L 43/0852 |
| | | | 370/230 |
| 2011/0093124 A1* | 4/2011 | Berggren | H02J 3/06 |
| | | | 700/286 |
| 2012/0284420 A1 | 11/2012 | Shukla et al. | |
| 2014/0161135 A1* | 6/2014 | Acharya | H04L 47/6255 |
| | | | 370/412 |

(Continued)

FOREIGN PATENT DOCUMENTS

| | | |
|---|---|---|
| CN | 103814557 A | 5/2014 |
| CN | 109379305 A | 2/2019 |

OTHER PUBLICATIONS

International Search Report and Written Opinion, International Application No. PCT/IB2020/057774, dated Dec. 9, 2020, 9 pages.

*Primary Examiner* — Charles E Anya
(74) *Attorney, Agent, or Firm* — Daniel M. Yeates

(57) ABSTRACT

A method and related system to concurrently process a temporal message stream. The method comprises obtaining messages of a message stream, each message having an associated timestamp. The method further comprises storing each message in at least one of a plurality of queues, wherein the messages of each queue are ordered based on their timestamp such that a message with the earliest timestamp is positioned at the front of the queue. The method then comprises controlling retrieval of the target message from the front of a target queue based on a timing difference between the timestamp of the message and the timestamps of the front message of each of the other queues of the plurality of queues.

22 Claims, 6 Drawing Sheets

(56) References Cited

U.S. PATENT DOCUMENTS

| | | |
|---|---|---|
| 2015/0156130 A1 | 6/2015 | Varsanyi |
| 2017/0093738 A1* | 3/2017 | Imaki ................ H04L 29/06 |
| 2018/0007180 A1* | 1/2018 | Pal .................... H04L 67/2819 |
| 2018/0248825 A1 | 8/2018 | Sedan |
| 2019/0149504 A1* | 5/2019 | Norwood ............ H04L 12/66 |
| | | 709/206 |
| 2019/0303224 A1* | 10/2019 | Liu .................... H04L 51/16 |
| 2020/0073736 A1* | 3/2020 | Xia .................... G06F 9/542 |
| 2020/0104198 A1* | 4/2020 | Hussels .............. G06F 9/5066 |

* cited by examiner

PROCESSING OF A MESSAGE STREAM

BACKGROUND

The present disclosure relates generally to processing data, and more particularly to a method for processing a temporal message stream.

The present disclosure also relates to a system for processing a message stream.

The present disclosure further relates to a computer program product comprising computer-readable program code that enables a processor of a system to implement such a method.

A traditional data processing system for processing temporal data (or data that does not require strict sequencing but requires processing the data at a similar time) may typically comprise a processing engine that is adapted to process data streams. Such a processing engine may process fast data streams in real-time and, to cater for different sized streams, the processing engine may be scaled based on the size of the data streams. However, this scaling can lead to output data being out of sequence and thus make the resulting output data unusable.

For example, applications in a system may send metric data (e.g., response times, transaction rates, and central processing unit (CPU) usage) to a metric processing engine through a message hub. Subsequently, the metric processing engine may send the metric data to an open-source metric analytics tool. Scaling the metric processing engine comprises separating a topic corresponding to the metric data into partitions (or queues), enabling the metric data to be shared between instances of the metric processing engine. However, if a problem occurs in one of the instances of the metric processing engine, the instances may run out of sync, resulting in an unusable output at a user-interface of the metric analytics tool (e.g., the transaction rates data may show a workload spike out of step with other data, preventing accurate data correlation and problem diagnosis).

In another example, a company that sells or distributes a large quantity of items (e.g., a ticket-sales company) may deal with a high rate of orders by decoupling actions corresponding to ordering an item and processing the order. Ordering an item may result in a message being placed on a topic specific to the item, with order messages (i.e., messages corresponding to created orders) being arranged across a number of partitions (henceforth referred to as queues) corresponding to the topic. A plurality of processing engines may be adapted to process the messages in each queue. However, there is a risk that the processing of the messages may be unevenly distributed across the plurality of processing engines. Consequently, this increases the risk of data arriving out of sequence, for example, an individual receiving the last item of the large quantity of items even if their corresponding order had been created significantly later than an order from another individual that is also yet to receive their ordered item. Further, the risk of an individual not having their order fulfilled due to a "slow" processing engine may be increased.

Therefore, there is a need in the art to address the aforementioned problems.

SUMMARY

The present disclosure also seeks to provide a system for processing of a message stream.

The present disclosure seeks to provide a computer-implemented method for processing of a message stream.

The present disclosure further seeks to provide a computer program product including computer program code for implementing a proposed method when executed by a controller unit.

According to an aspect of the present disclosure, there is provided a computer-implemented method for processing of a message stream. The method comprises obtaining messages of a message stream, each message having an associated timestamp. The method further comprises storing each message in at least one of a plurality of queues, wherein the messages of each queue are ordered based on their timestamp such that a message with the earliest timestamp is positioned at the front of the queue. The method also comprises controlling retrieval of a target message from the front of a target queue based on a timing difference between the timestamp of the target message and the timestamps of the front message of each of the other queues of the plurality of queues.

According to another aspect of the disclosure, there is provided a computer program product for processing of a message stream. The computer program product comprises a computer readable storage medium having program instructions embodied therewith, the program instructions executable by a processing unit to cause the processing unit to perform a method according to a proposed embodiment.

According to another aspect of the disclosure, there is provided a processing system comprising at least one processor and the computer program product according to an embodiment. The at least one processor is adapted to execute the computer program code of said computer program product.

According to yet another aspect of the disclosure, there is provided a system processing of a message stream. The system comprises an interface configured to obtain messages of a message stream, each message having an associated timestamp. The system further comprises a queue component configured to store each message in at least one of a plurality of queues. The messages of each queue are ordered based on their timestamp such that a message with the earliest timestamp is positioned at the front of the queue. The system further comprises a message retrieval component configured to control retrieval of a target message from the front of a target queue of the plurality of queues based on a timing difference between the timestamp of the target message and the timestamps of the front message of each of the other queues of the plurality of queues.

BRIEF DESCRIPTION OF THE DRAWINGS

Preferred embodiments of the present disclosure will now be described, by way of example only, with reference to the following drawings, in which.

DETAILED DESCRIPTION

Figure 1:
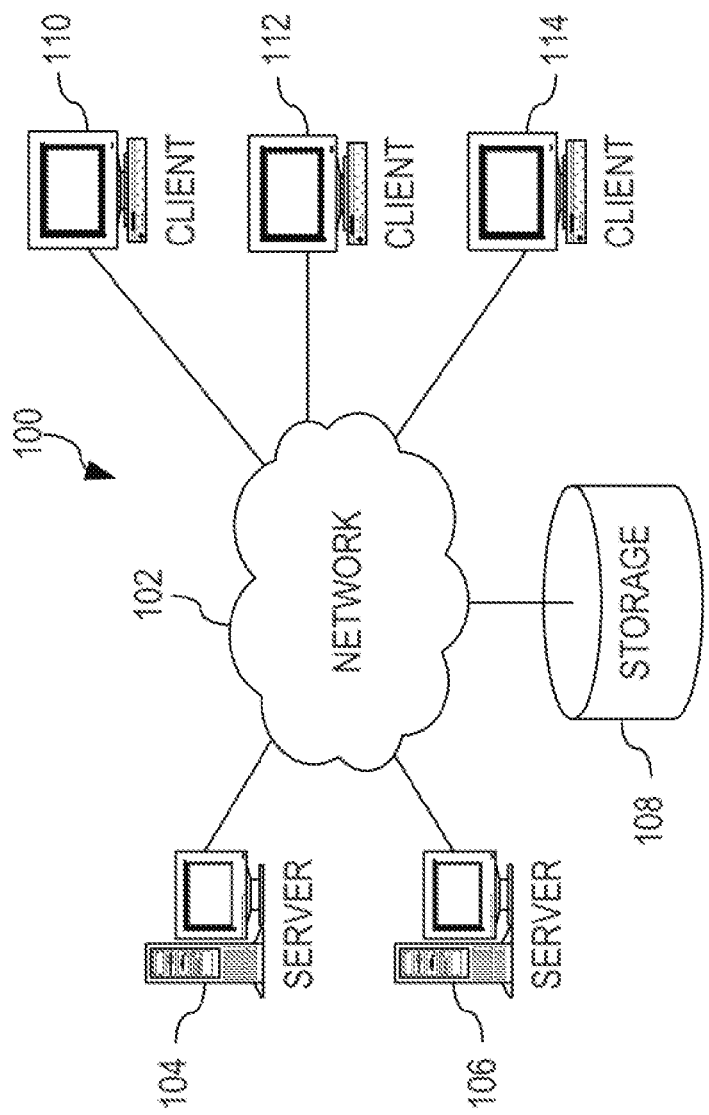
FIG. 1 depicts a pictorial representation of an example distributed system in which aspects of the illustrative embodiments may be implemented.

The Figures are merely schematic and are not drawn to scale. It should also be understood that the same reference numerals are used throughout the Figures to indicate the same or similar parts.

In the context of the present application, where embodiments of the present disclosure constitute a method, such a method may be a process for execution by a computer, i.e., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Concepts for processing a message stream are proposed. Such concepts may enable temporal data to be processed concurrently through scaling a processing engine while maintaining approximate temporal alignment of the processing. Accordingly, embodiments may facilitate concurrent processing of a temporal message stream.

Embodiments may be implemented in conjunction with a messaging or event system, e.g., Kafka®, Message Queue (MQ), or Java Message Service (JMS) implementations.

Proposed embodiments may employ a concept of defining a group of queues (or partitions or streams) within which messages may be stored and temporally aligned (e.g., queued). Messages may be retrieved from the queues in order, but such retrieval may be controlled based on timestamps associated with the messages. For instance, the timestamps may be analyzed and used to ensure that messages retrieved from the queues remain relatively in sync.

Embodiments of the present disclosure propose the provision of a message retrieval component. Such a message retrieval component may be configured to control retrieval of a message from the front of a queue of the plurality of queues based on a timing difference between the timestamp of the message and the timestamps of the front message of each of the other queues of the plurality of queues. For example, by only permitting retrieval of a message if it is within a predetermined allowable time difference of the earliest timestamp across all queues, retrieved messages may be maintained in temporal alignment.

Embodiments may thus provide for the improvement of concurrent processing of a temporal message stream by maintaining approximate temporal alignment of concurrently processed data.

By way of example, embodiments may be implemented in conjunction with messaging or streaming services. Such embodiments may enable temporal alignment of message streams without requiring a way to enforce strict ordering and/or single-thread behavior that does not enable scaling of processing engines. Accordingly, the allocation of messages is optimized, reducing the risk of inefficiency in messaging or streaming services. This is one example of advantages over the prior art.

For purposes of this disclosure a target message is one of the messages of a message stream. A message become the target message when a customer (or other component) attempts to remove the target message from a queue (e.g., the subject of a GET command, where a GET command is code that removes the message from the queue for subsequent processing). Generally, the target message will be the first message (e.g., next in line, message with the earlies timestamp, etc.) in the queue. The queue that contains the target message may be referred to as the target queue.

For purposes of this disclosure a topic can be a group, stream, and/or a partition. A topic can be any way of sorting and/or organizing the plurality of messages in a message stream to sort them into different queues. They topics can be (or related to) size of the message, type of message (e.g., format), source of the data, random, round robin, sequentially, and/or any other method of sorting. For example, assume the system is related to selling tickets to an event. At a specific time, the tickets will get released and several purchase messages will be created. The topics for the tickets can be, number of tickets purchased, total amount of the purchase, based on the individual ticket price, based on the location of the originating purchase, based on the section (e.g. seats vs open seating) of the requested tickets, and/or or other similar factors.

In a proposed embodiment, controlling retrieval may comprise, determining a timing difference between a target message, and the front message from each of the other queues. The timing difference is the difference between timestamps of two messages. Controlling retrieval may then comprise identifying the largest value of timing difference from the determined timing differences, then permitting retrieval of the target message from the target queue based on whether the largest value of timing difference exceeds a threshold value. In this way, the retrieval of messages may be controlled such that messages are retrieved from queues evenly across all queues. This may optimize the temporal alignment of the data corresponding to the messages, enabling temporally similar data to be processed at a similar time. Thus, the risk of disrupting an order of sequence of temporal data due to scaling may be reduced. This provides the advantage of efficiently scaling processes.

In some embodiments, controlling retrieval may further comprise receiving an input signal representative of a temporal alignment requirement and determining the threshold value based on the received input signal. Thus, the threshold value used to establish the retrieval of a message may be dependent on a temporal alignment requirement. This enables the establishing of the retrieval of a message to be based on the requirements for the method and/or system, and can be automatically adjusted with respect to the requirements. In this way, the efficiency of the method and/or system for concurrent processing of a temporal message stream is optimized.

In a proposed embodiment, permitting retrieval of the target message may occur when the largest value of timing difference does not exceed the threshold value. Further, retrieval of the target message may be denied if the largest value of timing difference exceeds the threshold value. Thus, the retrieval of messages may be maintained evenly across each of the plurality of queues. This may reduce a risk of bias among the plurality of queues when retrieving messages, consequently reducing the risk of a queue retrieving a considerably higher/lower quantity of messages in comparison to an average quantity across the plurality of queues.

In some embodiments, an error message may be generated if the retrieval of the target message from the target queue is denied. In this way, a user can be alerted to the denial of a retrieval of a message. This may enable the queue corresponding to the denied retrieval to be identified, consequently enabling the rate of retrieval for each of the plurality of queues to be determined and analyzed. If a relatively larger quantity of retrievals is denied in a particular queue, the quantity of which can be determined, the queue can thus be identified, and corrective measures can be taken.

The method for concurrent processing of a temporal message stream may further comprise generating a timestamp for each obtained message, the timestamp representing a time associated with the message. In this way, each message comprises a corresponding time identified by the timestamp. For example, the timestamp associated with a message may identify the time at which the message was obtained (e.g., received by the interface). This enables the messages to be organized in a time-dependent sequence, optimizing the temporal alignment.

An example of a timestamp may comprise the time the message is PUT to the queue, where PUT is a command in a programming language. This may be generated by the client publishing the message or the messaging system. This may be done at the time which the message is placed on the queue, or the time the message data is created. The time may be an epoch time or full date time string that may be in the message body (or in the message header/metadata).

In some embodiments, each message may be related to at least one of a plurality of topics. In some embodiments, the method for concurrent processing of a temporal message stream may further comprise, for each of the plurality of topics, defining one or more queues associated with each topic. The method may further comprise storing each message in at least one of the plurality of queues related to at least one topic in the queue associated with the same topic(s). Thus, the method may be expanded to group more than one topic, and consequently the corresponding plurality of queues. This may enable a plurality of topics relating to the messages to be processed in parallel, improving the efficiency of the method and/or system and enabling the complexity of the method and/or system to be increased.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
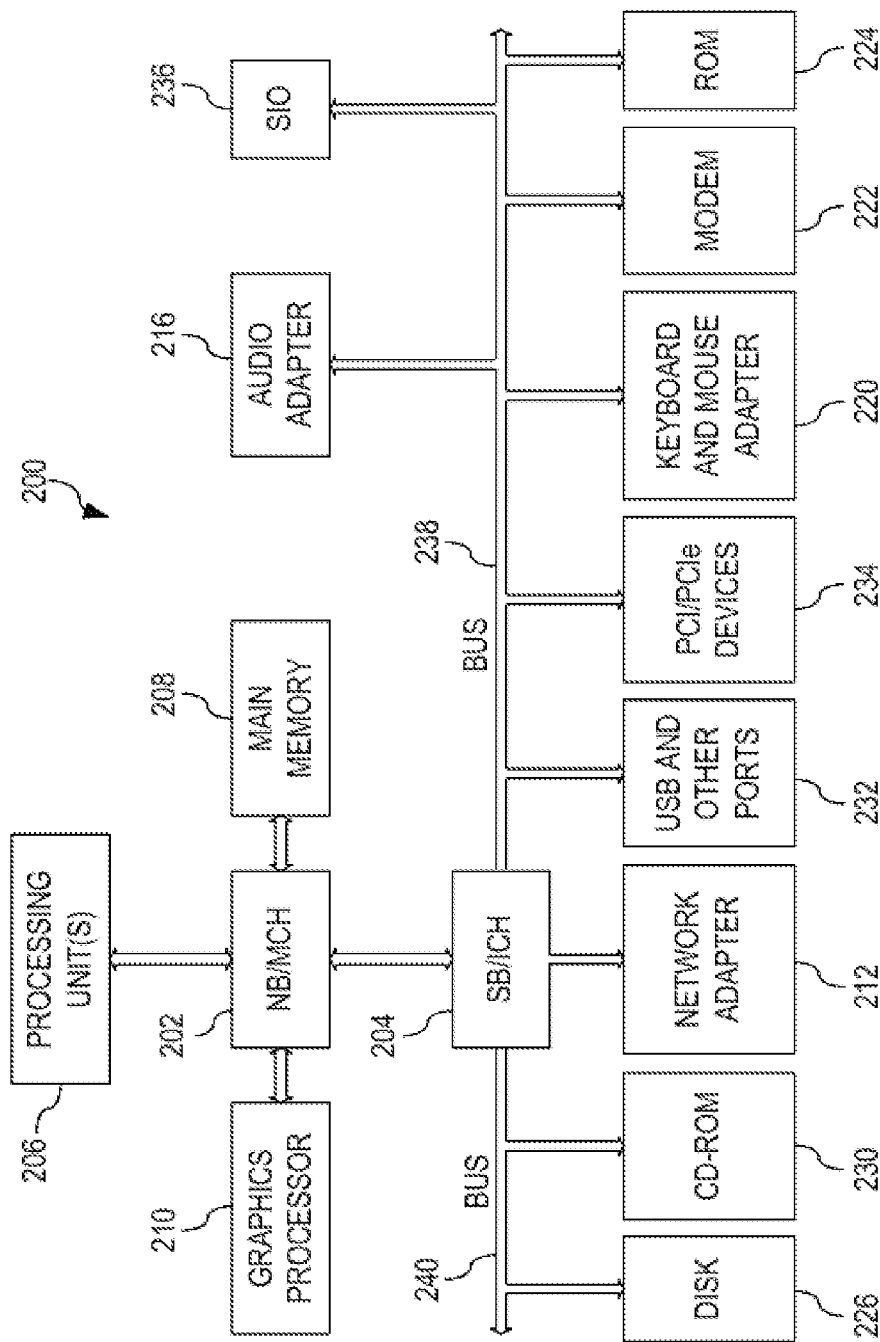
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. The bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation, and can be altered without affected the scope of the claims. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
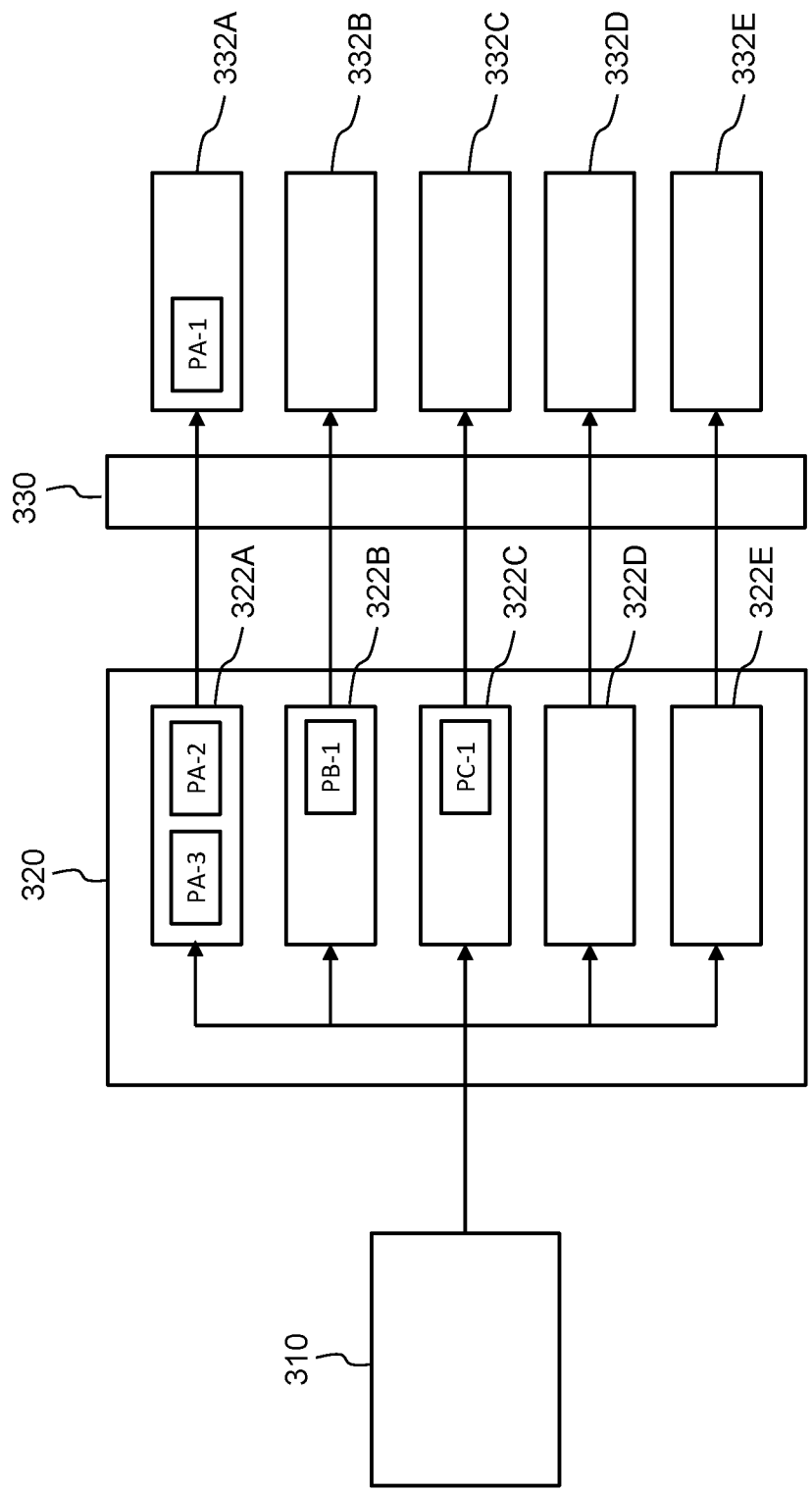
FIG. 3 is a simplified block diagram of an example embodiment of a system for concurrent processing of a temporal message stream.

Referring now to FIG. 3, there is depicted a simplified block diagram of an exemplary embodiment of a system for concurrent processing of a temporal message stream.

The system comprises an interface 310 configured to obtain messages of a message stream, each message having an associated timestamp. The system further comprises a queue component 320 configured to store each message in each of a plurality of queues 322, wherein the messages of each queue 322 are ordered based on their timestamp such that a message with the earliest timestamp is positioned at the front of the queue 322 (i.e., a first-in, first-out (FIFO) queue), message PB-1 in queue 322B. The system further comprises a message retrieval component 330 configured to control retrieval of a target message from the front of a target queue of the plurality of queues 322 based on a timing difference between the timestamp of the message and the timestamps of the front message of each of the other queues 322 of the plurality of queues 322. The message retrieval component 330 may communicate with a plurality of consumers 332, wherein each consumer 332 may retrieve messages from a corresponding queue 322, message PA-1 in consumer 332A. Here, although the consumers 332 may have a 1:1 mapping to a queue, a consumer 332 may retrieve messages from more than one queue 322, and a queue 322 may have messages retrieved by more than one consumer 332.

In some embodiments, the message retrieval component 330 is further configured to, for each of the other queues 322, determine a timing difference between the timestamp of the target message and the front message of each queue 322. The message retrieval component is further configured to identify the largest value of timing difference from the determined timing differences and to allow or deny retrieval of the target message from the target queue 322 based on whether the largest value of timing difference exceeds a threshold value.

In an embodiment, the message retrieval component 330 is further configured to permit retrieval of the target message from the target queue if the largest value of timing difference does not exceed the threshold value and deny retrieval of the target message from the target queue if the largest value of timing difference exceeds the threshold value. In some embodiments, the message with the earliest timestamp (or the message associated to the largest difference) is retrieved, and the timing differences are recalculated. Then there is a second largest different, or a remaining largest difference. These are determined in the same way as the largest difference.

In an embodiment, the message retrieval component 330 is further configured to generate an error message if the retrieval of the target message from the queue 322 is denied.

In an embodiment, the system further comprises an alignment configuration component (not shown) configured to receive an input signal representative of a temporal alignment requirement and to determine the threshold value based in the received input signal. In various embodiments, the alignment configuration component is a component of and/or incorporated into interface 310, queue component 320, message retrieval component 330, and/or a separate component.

In some embodiments, the system further comprises a timing component configured, for each message, to generate a timestamp representing a time associated with the message and to associate the generated timestamp with the message. For example, a timestamp for a message may represent the time at which the message is generated or PUT to a queue. In various embodiments, the timing component is a component of and/or incorporated into interface 310, queue component 320, message retrieval component 330, and/or a separate component.

In some embodiments, each message is related to at least one of a plurality of topics. The queue component 320 is further configured, for each of the plurality of topics, to associate one or of queues 322 with one or more topics and to store each message in at least one of the plurality of queues 322 associated with the topic(s) that the message is related to.

Figure 4:
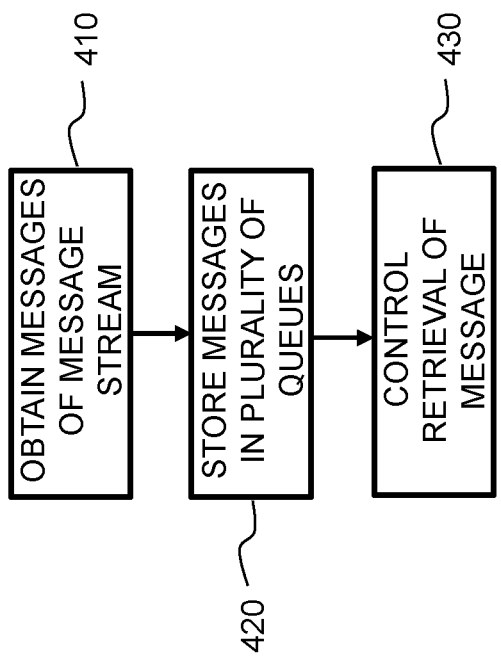
FIG. 4 is a flow diagram of a computer-implemented method for concurrent processing of a temporal message stream.

Referring now to FIG. 4, there is depicted a flow diagram of a computer-implemented method for processing of a message stream according to an embodiment. Such a method may enable a temporal message stream to be processed concurrently through scaling a processing engine while maintaining approximate temporal alignment of the processing.

Step 410 comprises obtaining messages of a message stream, each message having an associated timestamp. In some embodiments, step 410 includes generating a timestamp for each message.

In an embodiment, each message is related to at least one of a plurality of topics. In some embodiments, the method further comprises, for each of the plurality of topics, associating at least one topic to each queue. In some embodiments, the method further comprises, dividing the topic into a plurality of partitions and allocating one or more consumers to each queue.

Figure 5:
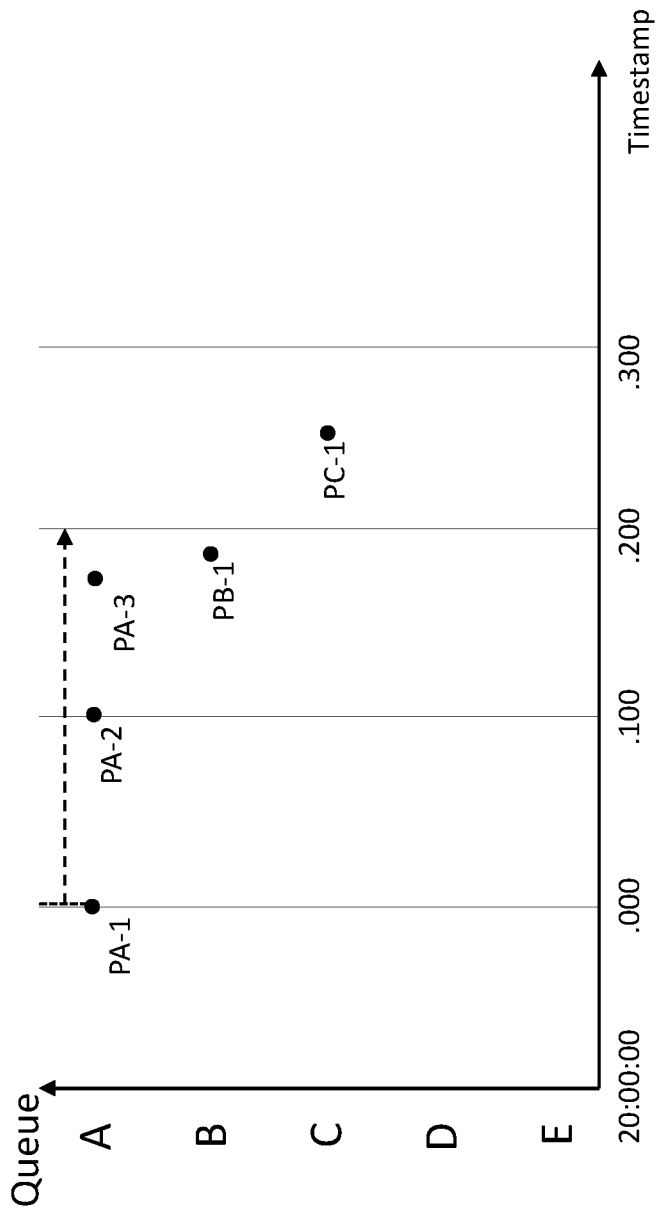
FIG. 5 is a graph of the steps involved in a method of an exemplary embodiment, wherein the vertical axis describes each of a plurality of queues and the horizontal axis describes a time of a timestamp corresponding to a message.

For example, a user may create a topic containing five queues (e.g., partitions, streams, and/or topics) in a messaging system. Five consumers may be allocated to the topic as group consumers, providing one consumer to each queue. Each message is distributed to one of the queues based on some sorting factor (e.g., size, content, origination location, data type, round robin, random, etc.) Each consumer processes messages corresponding to their respective queue once retrieved from the queue. This example is depicted in FIG. 3, wherein the five queues 322A, 322B, 322C, 322D, 322E and five allocated consumers 332A, 332B, 332C, 332D, 332E handle messages PA-1, PA-2, PA-3 for queue 322A, PB-1 for queue 322B, and PC-1 for queue 322C. FIG. 5 depicts a graph of the steps involved in this example, wherein the vertical axis describes each of the plurality of queues and the horizontal axis describes the time of the timestamp corresponding to a message. The example described below relates to the information depicted in FIG. 3 and FIG. 5.

Step 420 comprises storing each message in at least one of a plurality of queues, wherein the messages of each queue are ordered based on their timestamp such that a message with the earliest timestamp is positioned at the front of the queue. Here, each message in stored in at least one of the queues associated with the topic(s) that the message is related to.

Step 430 comprises controlling retrieval of a target message from the front of a target queue based on a timing difference between the timestamp of the message and the timestamps of the front message of each of the other queues of the plurality of queues. In the example, the messages may be retrieved from the plurality of queues to the consumers evenly and consecutively from each of the plurality of queues.

In an embodiment, controlling retrieval may comprise, for each of the other queues, determining a timing difference between the timestamp of the target message and the front message of each of the other queues. Controlling retrieval may then comprise identifying the largest value of timing difference from the determined timing differences, and then permitting retrieval of the target message from the target queue based on whether the largest value of timing difference exceeds a threshold value.

In the example, the user may define a threshold value, which may also be referred to as a temporal alignment, of 100 ms. However, the threshold value can be more or less than 100 ms. For example, a first queue 322A out of the five queues may obtain a message containing a comparatively large event, event PA-1, with a timestamp of 20:00:00.000 and duration of 200 ms to process. The message corresponding to event PA-1 is retrieved by the consumer 332A corresponding to the first queue. The next message in the first queue 322A may contain another event, event PA-2, with a timestamp of 20:00:00.100. The consumer 332B corresponding to the next consecutive queue, i.e., a second queue 322B, may attempt to retrieve the next event from the front message of the second queue 322B, e.g., event PB-1 with a timestamp of 20:00:00.190. The timestamps of each event corresponding to messages at the front of each queue may be determined.

In an embodiment, retrieval of the target message from the target queue is permitted if the largest value of timing difference does not exceed the threshold value, and retrieval of the target message from the target queue is denied if the largest value of timing difference exceeds the threshold value. In this way, when a message is retrieved, the timestamps of the messages at the front of each queue are compared. If the value of timing difference between an earliest timestamp across all queues and the timestamp corresponding to a target message in a target queue, the message corresponding to the earliest timestamp is retrieved.

In the example, the timing difference between the timestamp corresponding to event PB-1 (20:00:00.190) and the timestamp corresponding to event PA-1 (20:00:00.100) is 90 ms, which does not exceed the threshold value of 100 ms. This is obtained by subtracting the timestamp of the front message from the timestamp of the target message (e.g., (Target message timestamp)–(First message of different queue), 20:00:00.190–20:00:00.100) This permits the message containing event PB-1 to be retrieved by the consumer 332B corresponding to the target queue, in this case the second queue 322B.

In an embodiment, permitting retrieval of the target message further comprises generating an error message if the retrieval of the target message from the target queue is denied. The error message may comprise a return code or message indicating that output data is out of sync. If the retrieval of the target message from the target queue is denied, then the process may be temporarily paused until the timestamps corresponding to the messages at the front of each queue permit a corresponding timing difference that does not exceed the threshold value.

Controlling retrieval may further comprise receiving an input signal representative of a temporal alignment requirement, then determining the threshold value based on the received input signal.

In the example, a message from the next consecutive queue, a third queue 322C, may contain another event, event PC-1 with a timestamp of 20:00:00.250. The timestamps of each event corresponding to messages to the front of each queue may be determined. The timestamp corresponding to event PA-2 is the earliest at that point in time, with a time difference between the timestamp corresponding to event PA-2 (20:00:00.100) and the timestamp corresponding to event PC-1 (20:00:00.250) being 150 ms, exceeding the threshold value of 100 ms. Thus, the request for retrieval from the queue 322C is denied and event PC-1 is not retrieved. Consider the opposite, PA-2 is the target message, now the difference is negative 150 ms, which is less than the threshold of 100 ms, and PA-2 could be retrieved.

The processing of the message corresponding to event PA-1 is completed and the message corresponding to the next event in the first queue 322A, event PA-2 is retrieved. A message from the first queue 322A may contain another event, e.g., event PA-3 with a timestamp of 20:00:00.180. The timestamps of each event corresponding to messages to the front of each queue may be determined. The timing difference between the timestamp corresponding to event PC-1 (20:00:00.250) and the timestamp corresponding to event PA-3 (20:00:00.180) is 70 ms, which does not exceed the threshold value of 100 ms. This permits the message containing event PC-1 to be retrieved by the consumer 332C corresponding to the target queue, in this case the third queue 322C.

In some embodiments, the threshold value is dynamically determined. It can be based on the number of messages in the queues, the relative processing time of the messages in the queues, the time differences between the timestamps of the messages, and/or any other similar factors. For example, the threshold value can be the average of differences between the timestamp of the first and second message in each queue. Another example, the threshold value can be the message with the longest processing time (e.g., 00:00.100) in any queue plus a predetermined period of time (e.g., x+00:00.150). therefore, if the longest processing time for a message in the queues is 00:00.100 the threshold value would be 00:00.2500.

The above example may be expanded to group more than one topic (and consequently the corresponding queues). In this embodiment, each group may be given an identifier to correlate consumers between each topic.

Figure 6:
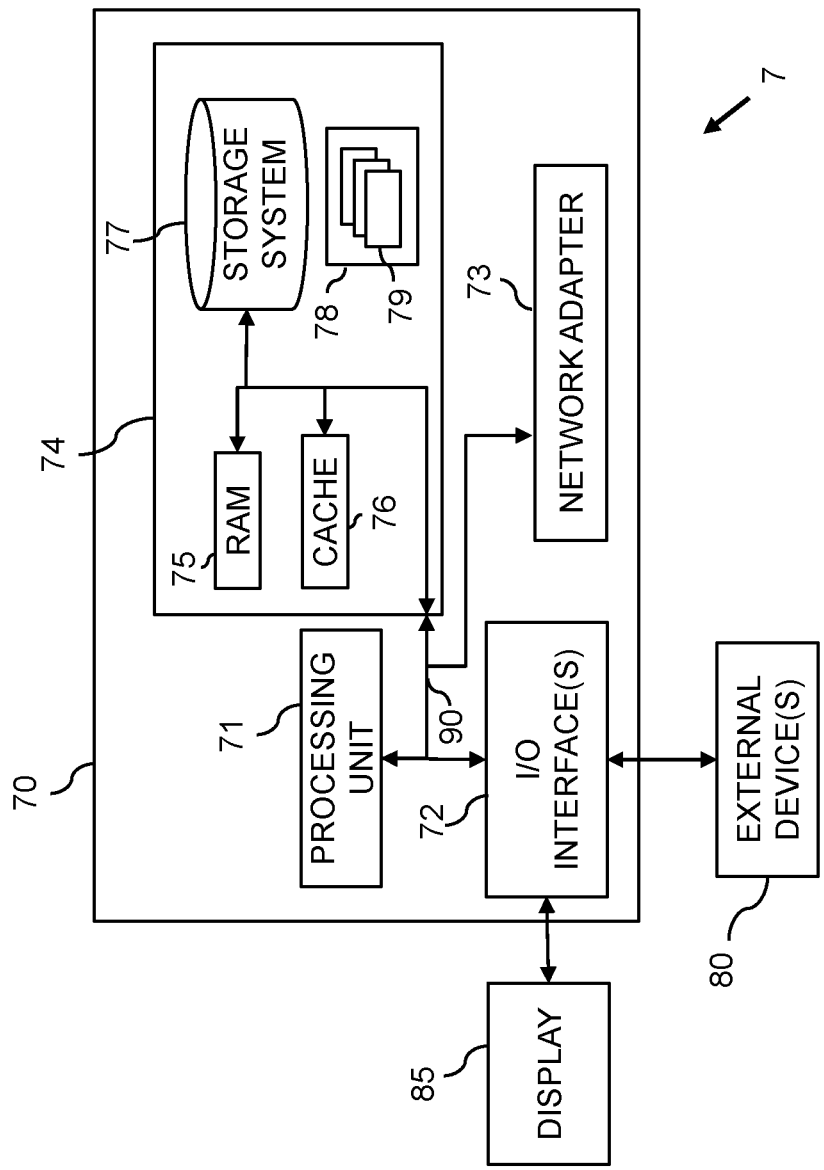
FIG. 6 is a simplified block diagram of an exemplary embodiment of a system for concurrent processing of a temporal message stream.

By way of further example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

The processing unit 71 is configured to define a target object type; the target object type is adapted to hold results of a middleware function. Further, the processing unit 71 is configured to receive a first object for an application, then perform a process of the middleware function using the first object to generate a process result. Based on the process result, the processing unit 71 is configured to generate a second object of the target object type, and provide the second object to the application.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e., is a computer-implementable method. The various steps of the method therefore reflect various parts of a computer program, e.g., various parts of one or more algorithms.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In summary, various embodiments have been discussed which are again specified in the following numbered examples:

Example 1 is as follows. A computer-implemented method for processing of a message stream, the method comprising: obtaining messages of a message stream, each message having an associated timestamp; storing each message in at least one of a plurality of queues, wherein the messages of each queue are ordered based on their timestamp such that a message with the earliest timestamp is positioned at a front of the queue; and controlling retrieval of a target message from the front of a target queue based on a timing difference between the timestamp of the target message and the timestamps of a front message of each of other queues of the plurality of queues that do not include the target queue.

Example 2 is as follows. The method of example 1, wherein the controlling of the retrieval comprises: for each of the other queues, determining a timing difference between the timestamp of the target message and a front message of the queue; identifying a largest value of timing difference from the determined timing differences; and permitting retrieval of the target message from the target queue based on whether the largest value of timing difference exceeds a threshold value.

Example 3 is as follows. The method of examples 1 or 2, wherein permitting retrieval of the target message comprises: permitting retrieval of the target message from the target queue if the largest value of timing difference is less than the threshold value.

Example 4 is as follows. The method of any of the preceding examples, further comprising: denying retrieval of the message from the target queue if the largest value of timing difference exceeds the threshold value; and generating an error message in response to the retrieval of the message from the target queue being denied.

Example 5 is as follows. The method of any of the preceding examples, further comprising: generating an error message in response to the retrieval of the message from the target queue being denied.

Example 6 is as follows. The method of any of the preceding examples, further comprising: delaying retrieval of the message from the target queue being denied.

Example 7 is as follows. The method of any of the preceding examples, further comprising: determining the message associated with the longest value is no longer in its associated queue; identifying a remaining largest value of timing differences from the determined timing differences; and permitting retrieval of the target message from the target queue if the remaining largest value of timing difference is less than the threshold value.

Example 8 is as follows. The method of any of the preceding examples, further comprising: receiving an input signal representative of a temporal alignment requirement; and determining the threshold value based on the received input signal.

Example 9 is as follows. The method of any of the preceding examples, wherein the threshold value is equal to an average of the first message and a second message in each queue.

Example 10 is as follows. The method of any of the preceding examples, further comprising, for each obtained message: generating a timestamp representing a time associated with the message; and associating the generated timestamp with the message.

Example 11 is as follows. The method of any of the preceding examples, wherein: each message is related to at least one of a plurality of topics; the method further comprises, for each of the plurality of topics, defining a plurality of queues associated with at least one topic; and the storing of each message in at least one of a plurality of queues comprises: storing each message in at least one of the plurality of queues associated with the topic(s) that the message is related to.

Example 12 is as follows. A computer program product for processing of a message stream, the computer program product comprising a computer readable storage medium having program instructions embodied therewith, the program instructions executable by a processing unit to cause the processing unit to: obtain messages of a message stream, each message having an associated timestamp; store each message in at least one of a plurality of queues, wherein the messages of each queue are ordered based on their timestamp such that a message with the earliest timestamp is positioned at a front of the queue; and control retrieval of a target message from a front of a target queue based on a timing difference between the timestamp of the target message and the timestamps of the front message of each of the other queues of the plurality of queues.

Example 13 is as follows. The computer program product according to example 12, wherein the program instruction are further configured to cause the processing unit to: for each of the other queues, determine a timing difference between the timestamp of the target message and a front message of each queue; and identify a largest value of timing difference from the determined timing differences.

Example 14 is as follows. The computer program product according to examples 12 or 13, wherein the program instruction are further configured to cause the processing unit to: permit retrieval of the target message from the target queue if the largest value of timing difference is less than the threshold value.

Example 15 is as follows. The computer program product according to any of the examples 12 to 14, wherein the program instruction are further configured to cause the processing unit to: deny retrieval of the message from the target queue if the largest value of timing difference exceeds the threshold value; and generate an error message in response to the retrieval of the message from the target queue being denied.

Example 16 is as follows. A system for processing of a message stream, the system comprising: an interface configured to obtain messages of a message stream, each message having an associated timestamp; a queue component configured to store each message in at least one of a plurality of queues, wherein the messages of each queue are ordered based on their timestamp such that a message with the earliest timestamp is positioned at a front of the queue; and a message retrieval component configured to control retrieval of a target message from a front of a target queue based on a timing difference between the timestamp of the target message and the timestamps of a front message of each of other queues of the plurality of queues that are not the target queue.

Example 17 is as follows. The system according to example 16, wherein the message retrieval component is configured to: for each of the other queues, determine a timing difference between the timestamp of the target message and the front message of the queue; identify the largest value of timing difference from the determined timing differences; and permit retrieval of the target message from the requested queue based on whether the largest value of timing difference exceeds a threshold value.

Example 18 is as follows. The system according to examples 16 or 17, wherein the message retrieval component is configured to: permit retrieval of the target message from the requested queue if the largest value of timing difference does not exceed the threshold value.

Example 19 is as follows. The system according to any of the examples 16 to 18, wherein the message retrieval component is further configured to generate an error message in response to denying retrieval of the target message from the requested queue if the largest value of timing difference exceeds the threshold value.

Example 20 is as follows. The system according to any of the examples 16 to 19, further comprising: an alignment configuration component configured to receive an input signal representative of a temporal alignment requirement and to determine the threshold value based in the received input signal.

Example 21 is as follows. The system according to any of the examples 16 to 20, further comprising: a timing component configured, for each obtained message, to generate a timestamp representing a time associated with the message and to associate the generated timestamp with each message.

Example 22 is as follows. The system according to any of the examples 16 to 21, wherein each message is related to at least one of a plurality of topics, wherein the queue component is further configured, for each of the plurality of topics, to define a plurality of queues associated with the topic; and wherein the queue component is further configured to store each message in each of the plurality of queues associated with the topic(s) that the message is related to.

Example 23 is as follows. The system according to any of the examples 16 to 22, wherein a user defines the threshold value.

Example 24 is as follows. A computer-implemented method for processing of a message stream, the method comprising: obtaining messages of a message stream, each message having an associated timestamp, wherein each message is related to at least one of a plurality of topics; defining a plurality of queues associated with at least one topic; and storing each message in at least one of the plurality of queues associated with the at least one topic each message is related to; storing each message in at least one of a plurality of queues, wherein the messages of each queue are ordered based on their timestamp such that a message with the earliest timestamp is positioned at a front of the queue; generating a timestamp representing a time associated with the message; associating the generated timestamp with the message; controlling retrieval of a target message from the front of a target queue based on a timing difference between the timestamp of the target message and the timestamps of a front message of each of other queues of the plurality of queues that do not include the target queue; for each of the other queues, determining a timing difference between the timestamp of the target message and a front message of the queue; identifying a largest value of timing difference from the determined timing differences; receiving an input signal representative of a temporal alignment requirement; determining the threshold value based on the received input signal; and permitting retrieval of the target message from the target queue in response to the largest value of timing difference being less than the threshold value.

Example 25 is as follows. A system comprising: a processor; and a computer-readable storage medium communicatively coupled to the processor and storing program instructions which, when executed by the processor, are configured to cause the processor to: obtain messages of a message stream, each message having an associated timestamp, wherein each message is related to at least one of a plurality of topics; define a plurality of queues associated with at least one topic; and store each message in at least one of the plurality of queues associated with the at least one topic each message is related to; store each message in at least one of a plurality of queues, wherein the messages of each queue are ordered based on their timestamp such that a message with the earliest timestamp is positioned at a front of the queue; generate a timestamp representing a time associated with the message; associate the generated timestamp with the message; control retrieval of a target message from the front of a target queue based on a timing difference between the timestamp of the target message and the timestamps of a front message of each of other queues of the plurality of queues that do not include the target queue; for each of the other queues, determine a timing difference between the timestamp of the target message and a front message of the queue; identify a largest value of timing difference from the determined timing differences; receive an input signal representative of a temporal alignment requirement; determine the threshold value based on the received input signal; delay retrieval of the message from the target queue being denied; determine the message associated with the longest value is no longer in its associated queue; identify a remaining largest value of timing differences from the determined timing differences; and permit retrieval of the target message from the target queue if the remaining largest value of timing difference is less than the threshold value.

What is claimed is:

1. A computer-implemented method for processing of a message stream, the method comprising:
   obtaining messages of a message stream, each message having an associated timestamp;
   storing each message in at least one of a plurality of queues, wherein the messages of each queue are ordered based on their timestamp such that a message with the earliest timestamp is positioned at a front of the queue;
   controlling retrieval of a target message from the front of a target queue based on a timing difference between the timestamp of the target message and the timestamps of a front message of each of other queues of the plurality of queues that do not include the target queue, wherein a first message in a first queue has a first timestamp earlier than the timestamp of the target message, and wherein the controlling of the retrieval comprises:
      for each of the other queues, determining a timing difference between the timestamp of the target message and a front message of each queue, and
      identifying a largest value of timing difference from the determined timing differences, and
   permitting a retrieval of the target message from the target queue, wherein the permitting of the retrieval of the target message from the target queue is based on whether the largest value of timing difference exceeds a threshold value.

2. The method of claim 1, wherein the permitting of the retrieval of the target message comprises:
   permitting retrieval of the target message from the target queue conditioned upon the largest value of timing difference being less than the threshold value.

3. The method of claim 1, further comprising:
   denying retrieval of the target message from the target queue conditioned upon the largest value of timing difference exceeding the threshold value; and
   generating an error message in response to the retrieval of the target message from the target queue being denied.

4. The method of claim 1, further comprising:
   delaying retrieval of the message from the target queue being denied.

5. The method of claim 4, further comprising:
   determining the message associated with the largest value of timing difference is no longer in its associated queue;
   identifying a remaining largest value of timing differences from the determined timing differences; and
   permitting retrieval of the target message from the target queue conditioned upon the remaining largest value of timing difference being less than the threshold value.

6. The method of claim 1, further comprising:
   receiving an input signal representative of a temporal alignment requirement; and
   determining the threshold value based on the received input signal.

7. The method of claim 1, wherein the threshold value is equal to an average of each timing difference of the front message and a second message in each queue.

8. The method of claim 1, further comprising, for each obtained message:
generating a timestamp representing a time associated with the message; and
associating the generated timestamp with the message.

9. The method of claim 1, wherein:
each message is related to at least one topic of a plurality of topics;
the method further comprises, for each of the plurality of topics, associating each queue of the plurality of queues with at least one topic; and
the storing of each message in at least one of a plurality of queues comprises:
storing each message related to the at least one topic in a queue associated with the at least one topic.

10. A computer program product for processing of a message stream, the computer program product comprising a computer readable storage medium having program instructions embodied therewith, the program instructions executable by a processing unit to cause the processing unit that:
obtains messages of a message stream, each message having an associated timestamp;
stores each message in at least one of a plurality of queues, wherein the messages of each queue are ordered based on their timestamp such that a message with the earliest timestamp is positioned at a front of the queue; and
controls retrieval of a target message from a front of a target queue based on a timing difference between the timestamp of the target message and the timestamps of the front message of each of the other queues of the plurality of queues, wherein a first message in a first queue has a first timestamp earlier than the timestamp of the target message, and wherein the controlling of the retrieval comprises:
for each of the other queues, determining a timing difference between the timestamp of the target message and a front message of each queue, and
identifying a largest value of timing difference from the determined timing differences, and
permitting, a retrieval of the target message from the target queue, wherein the permitting of the retrieval of the target message from the target queue is based on whether the largest value of timing difference exceeds a threshold value.

11. The computer program product of claim 10, wherein the program instruction are further configured to cause the processing unit that:
permits retrieval of the target message from the target queue conditioned upon the largest value of timing difference being less than the threshold value.

12. The computer program product of claim 10, wherein the program instruction are further configured to cause the processing unit that:
denies retrieval of the target message from the target queue if the largest value of timing difference exceeds the threshold value; and
generates an error message in response to the retrieval of the target message from the target queue being denied.

13. A system for processing of a message stream, the system comprising:
a processor;
a computer-readable storage medium communicatively coupled to the processor and storing program instructions;
an interface that obtain messages of a message stream, each message having an associated timestamp;
a queue component that store each message in at least one of a plurality of queues, wherein the messages of each queue are ordered based on their timestamp such that a message with the earliest timestamp is positioned at a front of the queue; and
a message retrieval component that:
control retrieval of a target message from a front of a target queue based on a timing difference between the timestamp of the target message and the timestamps of a front message of each of other queues of the plurality of queues that are not the target queue, wherein a first message in a first queue has a first timestamp earlier than the timestamp of the target message, and wherein the controlling of the retrieval comprises:
for each of the other queues, determine a timing difference between the timestamp of the target message and a front message of each queue, and
identify a largest value of timing difference from the determined timing differences, and
permit a retrieval of the target message from the target queue, wherein the permitting of the retrieval of the target message from the target queue is based on whether the largest value of timing difference exceeds a threshold value.

14. The system of claim 13, wherein the message retrieval component is that:
permit retrieval of the target message from the requested queue if the largest value of timing difference does not exceed the threshold value.

15. The system of claim 14, wherein the message retrieval component generates an error message in response to denying retrieval of the target message from the requested queue if the largest value of timing difference exceeds the threshold value.

16. The system of claim 14, further comprising:
an alignment configuration component receives an input signal representative of a temporal alignment requirement and to determine the threshold value based in the received input signal.

17. The system of claim 13, further comprising:
a timing component, for each obtained message, generates a timestamp representing a time associated with the message and to associate the generated timestamp with each message.

18. The system of claim 13, wherein, each message is related to at least one topic of a plurality of topics; and
wherein the queue component is further:
associate each queue of the plurality of queues with at least one topic of the plurality of topics; and store each message related to the at least one topic in a queue associated with the at least one topic.

19. The system of claim 13, wherein a user defines the threshold value.

20. A computer-implemented method for processing of a message stream, the method comprising:
obtaining messages of a message stream, each message having an associated timestamp, wherein each message is related to at least one of a plurality of topics;
defining a plurality of queues associated with at least one topic; and storing each message in at least one of the plurality of queues associated with the at least one topic each message is related to;
storing each message in at least one of a plurality of queues, wherein the messages of each queue are ordered based on their timestamp such that a message with the earliest timestamp is positioned at a front of the queue;
generating a timestamp representing a time associated with the message;
associating the generated timestamp with the message;
controlling retrieval of a target message from the front of a target queue based on a timing difference between the timestamp of the target message and the timestamps of a front message of each of other queues of the plurality of queues that do not include the target queue, wherein a first message in a first queue has a first timestamp earlier than the timestamp of the target message;
for each of the other queues, determining a timing difference between the timestamp of the target message and a front message of the queue;
identifying a largest value of timing difference from the determined timing differences;
receiving an input signal representative of a temporal alignment requirement;
determining a threshold value based on the received input signal; and
permitting retrieval of the target message from the target queue in response to the largest value of timing difference being less than the threshold value.

21. A system comprising:
a processor; and
a computer-readable storage medium communicatively coupled to the processor and storing program instructions executed by the processor, the program instructions are configured to cause the processor that:
   obtain messages of a message stream, each message having an associated timestamp, wherein each message is related to at least one of a plurality of topics;
   define a plurality of queues associated with at least one topic;
   store each message in at least one of the plurality of queues associated with the at least one topic each message is related to;
   store each message in at least one of a plurality of queues, wherein the messages of each queue are ordered based on their timestamp such that a message with the earliest timestamp is positioned at a front of the queue;
   generate a timestamp representing a time associated with the message;
   associate the generated timestamp with the message;
   control retrieval of a target message from the front of a target queue based on a timing difference between the timestamp of the target message and the timestamps of a front message of each of other queues of the plurality of queues that do not include the target queue, wherein a first message in a first queue has a first timestamp earlier than the timestamp of the target message;
   for each of the other queues, determine a timing difference between the timestamp of the target message and a front message of the queue;
   identify a largest value of timing difference from the determined timing differences;
   receive an input signal representative of a temporal alignment requirement;
   determine a threshold value based on the received input signal;
   delay retrieval of the message from the target queue being denied;
   determine the message associated with the longest value is no longer in its associated queue;
   identify a remaining largest value of timing differences from the determined timing differences; and
   permit, while the first message remains in the first queue, retrieval of the target message from the target queue if the remaining largest value of timing difference is less than the threshold value.

22. The system of claim 21, wherein the program instructions are further configured to cause the processor that:
   deny retrieval of the target message from the target queue if the largest value of timing difference exceeds the threshold value; and
   generate an error message in response to the retrieval of the target message from the target queue being denied.

* * * * *